(12) United States Patent
Kane et al.

(10) Patent No.: US 7,841,351 B1
(45) Date of Patent: Nov. 30, 2010

(54) COIL CLEANING MACHINE

(75) Inventors: Timothy Kane, Greenwich, CT (US);
Joseph J Franzino, Redding, CT (US);
George Cruz, Stamford, CT (US)

(73) Assignee: Goodway Technologies Corporation, Stamford, CT (US)

( * ) Notice: Subject to any disclaimer, the term of this patent is extended or adjusted under 35 U.S.C. 154(b) by 964 days.

(21) Appl. No.: 11/103,209

(22) Filed: Apr. 11, 2005

(51) Int. Cl.
*B08B 3/00* (2006.01)

(52) U.S. Cl. .................. 134/172; 239/154; 222/175

(58) Field of Classification Search .............. 134/172
See application file for complete search history.

(56) References Cited

U.S. PATENT DOCUMENTS

| | | | | |
|---|---|---|---|---|
| 3,525,912 A | * | 8/1970 | Wallin | 318/17 |
| 3,575,348 A | * | 4/1971 | MacKay | 239/127 |
| 5,421,900 A | * | 6/1995 | Clontz | 134/14 |
| 5,752,661 A | * | 5/1998 | Lewis | 239/153 |
| 6,448,732 B1 | * | 9/2002 | Block | 318/635 |
| 2005/0194024 A1 | * | 9/2005 | Wadsworth et al. | 134/26 |

* cited by examiner

*Primary Examiner*—Michael Barr
*Assistant Examiner*—Jason P Riggleman
(74) *Attorney, Agent, or Firm*—Patrick J. Walsh

(57) ABSTRACT

A machine for cleaning coils in HVAC installations including particularly the coils located in outdoor HVAC units and coils located in interior ductwork the machine comprising a shell housing enclosing cleaning fluids, an electrical system for line power or battery operation, and a fluid control system for selecting cleaning fluid and the pressure and volume of fluid applied in cleaning coils.

2 Claims, 4 Drawing Sheets

COIL CLEANING MACHINE

BACKGROUND OF THE INVENTION

The present invention is directed to a machine for cleaning coils in HVAC installations including particularly the coils located in outdoor HVAC units and coils located in interior ductwork.

A typical HVAC installation in residential and commercial buildings includes an outdoor condenser unit having heat exchange coils, indoor evaporator units having heat exchange fin and coil combinations with water condensate collection trays and drain lines located in ductwork, and air handling components. In operation, the outdoor coils accumulate deposits of pollen, grass clippings, insects, and so forth while indoor coils and fins tend to accumulate deposits of dust and dirt as well as bacteria, mold, and mildew. In addition, the indoor and as outdoor evaporator and condenser coils develop an oxidized film or coating that diminishes heat exchange efficiency.

For optimum operating efficiency of HVAC installations, heat transfer coils must be cleaned from time to time of such deposits and coatings that build-up in normal operation and by natural processes (i.e., oxidation) with passage of time. The present invention provides a machine capable of cleaning both outdoor coils and indoor coils located within ductwork in an effective manner so as to remove accumulated deposits and coil films or coatings which are detrimental to HVAC operating efficiency as part of a routine maintenance schedule that checks building operating costs by ensuring thermal efficiency and extending the useful operating life of an HVAC installation.

SUMMARY OF THE INVENTION

The present invention provides a coil cleaning machine of integrated operating components for movement from site to site, either on a wheeled dolly or by backpack, to enable a time and labor efficient routine maintenance program for HVAC installations.

In a preferred embodiment, the coil cleaning machine comprises a housing enclosing operating components, and includes separate tanks for cleaning water and cleaning chemical. An electrical system provides for either battery or line power operation of an electric pump for pressurized delivery of cleaning water and cleaning chemical as well as water supplied by garden hose, and a plumbing system for pressure and flow regulation of cleaning fluids, and for delivering either water or chemical or a mixture of them for cleaning coils. An array of interchangeable nozzles provides for selection of spray pattern and flow rate appropriate to location and type of coil being cleaned.

In preferred embodiment the housing is divided vertically into compartments with two upper side-by-side top loading compartments defining a water tank and a chemical tank, and two side-by-side lower compartments with one enclosing electric power components including AC/DC power supply, power selector, storage battery, battery charger, line current components, and the other lower compartment enclosing plumbing components including motor driven pump, inlet pressure regulator, siphon, selector valves, check valves, fluid lines, garden hose connection and exterior connections for applicator wand and nozzles.

In this preferred arrangement, the coil cleaning machine may be moved into position for coil cleaning on a wheeled dolly, or backpacked. A backpacked arrangement is particularly useful for access to remote ductwork coils where electric line power may not be conveniently available and with the machine employing battery power for a coil cleaning operation.

The coil cleaning machine is described with particular reference to cleaning HVAC coils, however, it is to be understood that the machine is useful in other applications such as agricultural spraying such as pesticides in home gardens, office plants and so forth.

Specific examples are included in the following description for purposes of clarity, but various details can be changed within the scope of the present invention.

OBJECTS OF THE INVENTION

An object of the invention is to provide a machine for cleaning HVAC condenser and evaporator coils.

Another object of the invention is to provide a compact, portable, self-contained machine for cleaning HVAC coils located in outdoor condenser coils and indoor ductwork evaporator coils.

Another object of the invention is to provide a coil cleaning machine for routine maintenance of HVAC equipment coils so as to control operating costs by maintaining thermal efficiency and by extending the useful life of HVAC equipment installed in residential and commercial buildings.

Other and further objects of the invention will become apparent with an understanding of the following detailed description of the invention or upon employment of the invention in practice.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE PREFERRED EMBODIMENT

Figure 2:
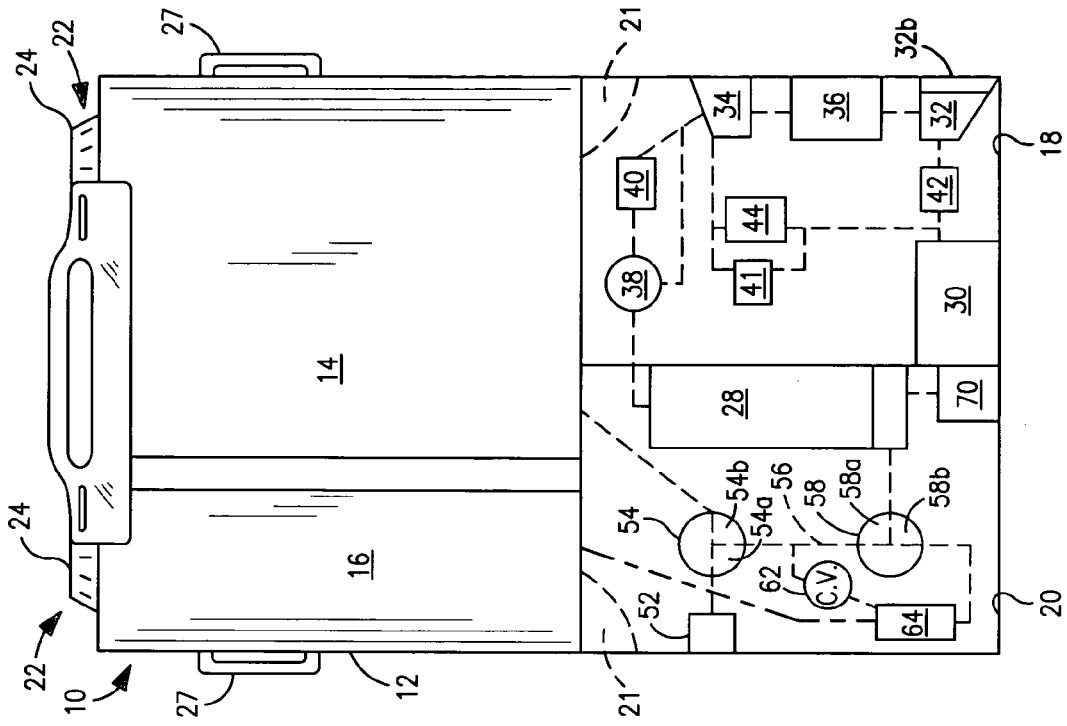
FIG. 2 is a rear elevation view thereof with cover plates removed to show electrical and plumbing compartments of the coil cleaning machine.
Figure 1:
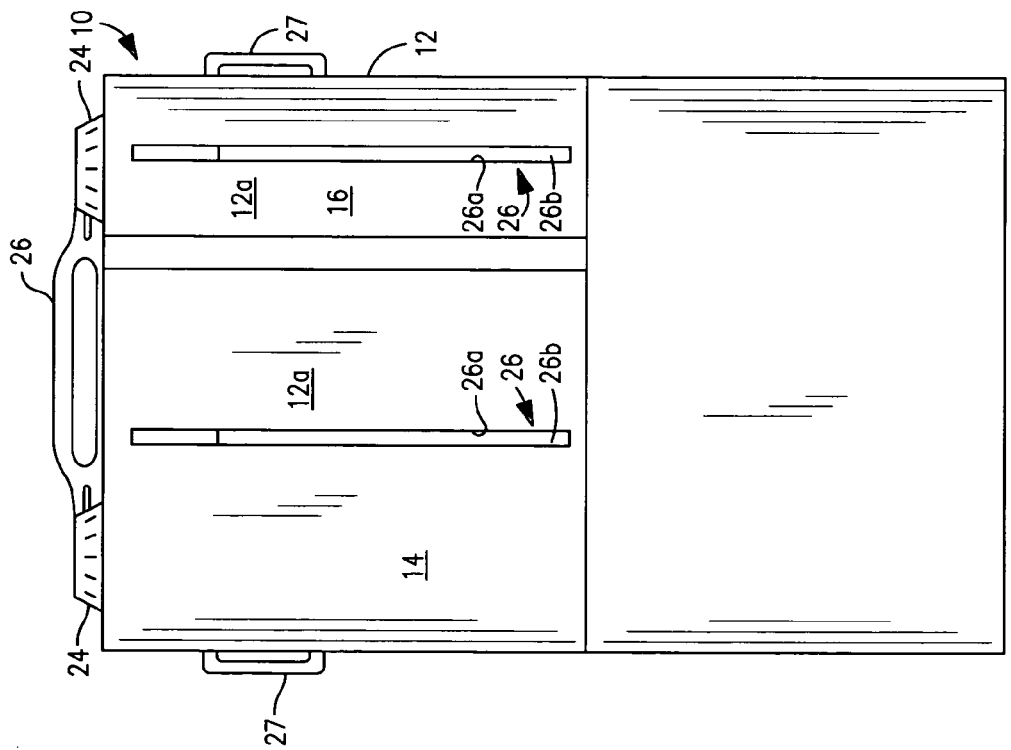
FIG. 1 is a front elevation view of a preferred embodiment of coil cleaning machine according to the invention.

Referring to FIGS. 1 and 2 of the drawing, a preferred embodiment of coil cleaner machine 10 comprises an integral housing or shell 12 having an upper portion defining a water tank 14 and a chemical cleaner tank 16, and a lower portion vertically divided into an electrical compartment 18 and a plumbing compartment 20 normally closed by cover plates 21. Both the water tank and the chemical cleaner tank are filled through a top openings 22 fitted with removable closure caps 24. Each tank is fitted with a level indicator 26 in the form of an elongate vertical aperture 26a in the tank front wall 12a fitted with a fluid tight sight glass 26b.

The housing shell 12 is fabricated of any suitable material such as polyethylene, aluminum, stainless steel and so forth for fluid tight water and chemical cleaner tanks, and for lightweight robust construction.

The top and side edges of the housing shell are fitted with slotted flanges 27 for handling the tank and for securing a harness by which the machine is backpacked especially for cleaning coils located in overhead ductwork for the air distribution in an HVAC system.

Figure 3:
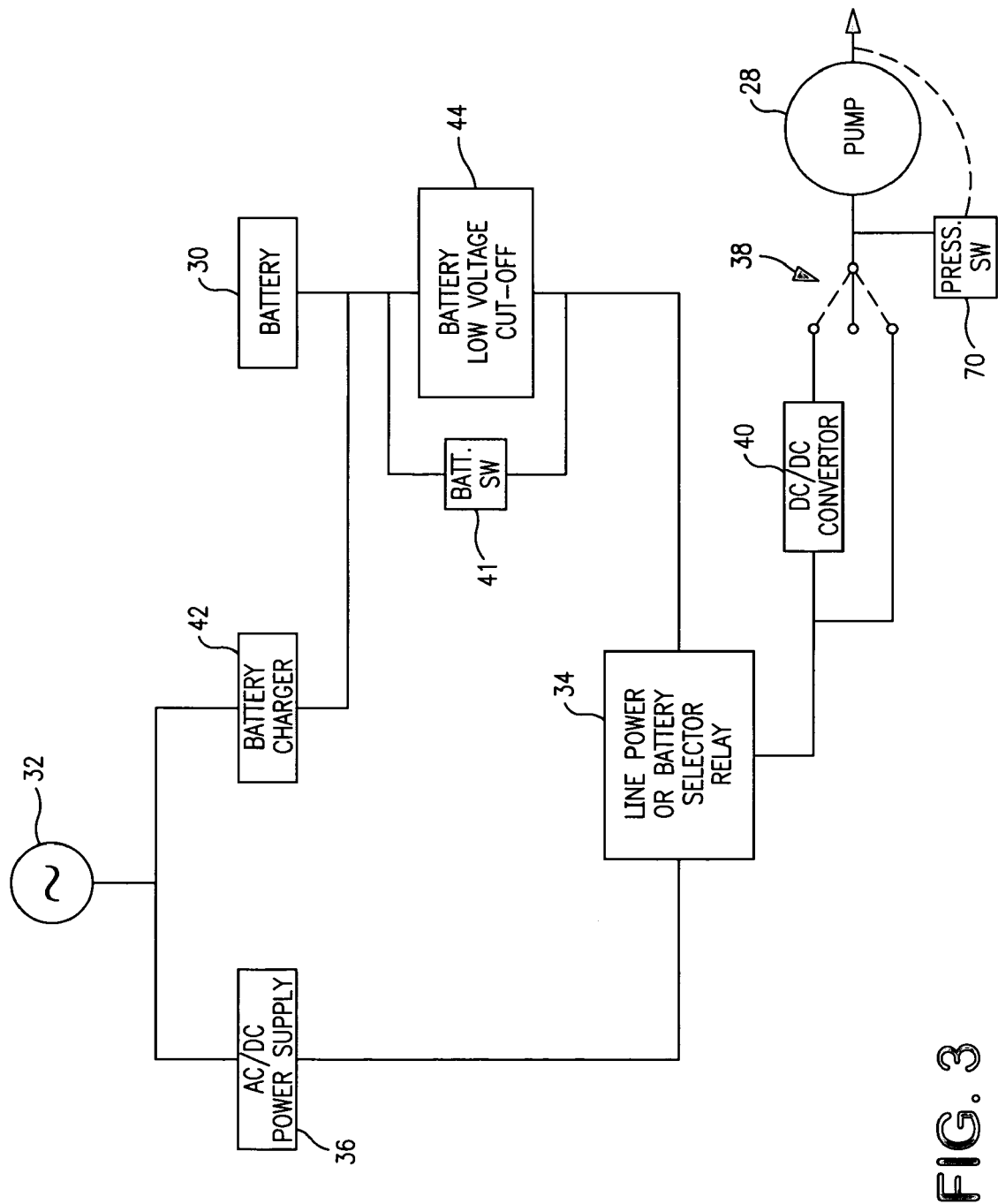
FIG. 3 is a schematic illustration of the electrical system of the coil cleaning machine of FIG. 1.

The electric system shown schematically in FIG. 3 and located in the electrical compartment provides motor driven pump 28 (in plumbing compartment 20) with 5 volt or 12 volt DC power selected from battery 30 power or line 32 power by means of relay selector 34. The selector relay provides for system operation from line power when the machine receives line power through power receptacle plug 32a (FIG. 4), and provides for battery power operation when the machine is not connected to line power.

In line power operation, the machine operator selects line voltage or either 115v or 230v by means of a switch 32b mounted on the outer wall 12a and connects the machine to a power line 32 at power receptacle 32a. An AC/DC power supply converter 36 transforms selected line voltage at 50-60 hertz to 12 volts DC for powering the motor driven pump through relay 34 and a selector switch 38 (12v DC) for high pressure operation of the pump. For low pressure operation of the pump, the selector switch 38 directs 12v DC operating power through DC/DC converter 40 reducing operating voltage to 5v DC.

When line power is selected, a battery charger 42 operates to charge the storage battery maintaining it at optimum operating capacity.

Battery operation of the machine occurs when the machine is not connected to line power. A battery switch 41 initiates the battery cut-off circuit 44, and starts the motor driven pump when powered by battery. The battery provides 12v DC power through relay 34 and selector switch 38 for either high pressure (12v DC) or low pressure (5v DC) operation of the motor driven pump as described above. The battery low voltage cutoff circuit protects the battery from a deep voltage draw and consequential permanent damage to the battery.

Figure 7:
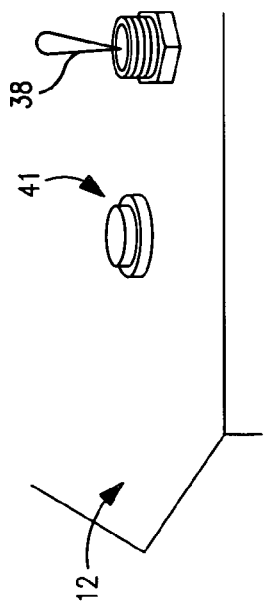
FIG. 7 is an illustration of exterior mounted switches for the electrical system of the coil cleaning machine.
Figure 4:
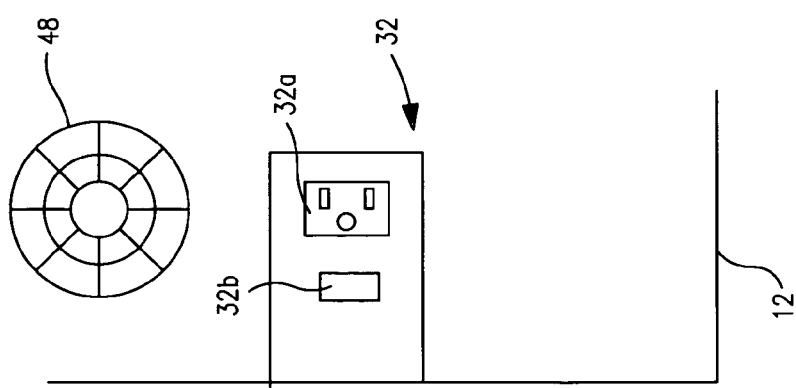
FIG. 4 is a schematic illustration of exterior mounted fittings for the electrical system of the coil cleaning machine.

The external electrical fittings are shown schematically in FIG. 4 including line voltage receptacle 32a, a line voltage selector 32b for 115v and 230v, and a vent grille 48 for exhausting warm air from the compartment. FIG. 7 shows operating switch 38 located in top wall 12 to select "off" position of the electrical system, "high" or 12v DC power to the motor for high pressure operation, and "low" or 5v DC and low pressure operation. The switch 38 can be a three position rotary switch or toggle switch (as shown). The external fittings also include starter switch 41 (FIG. 7) for battery operation.

Figure 5:
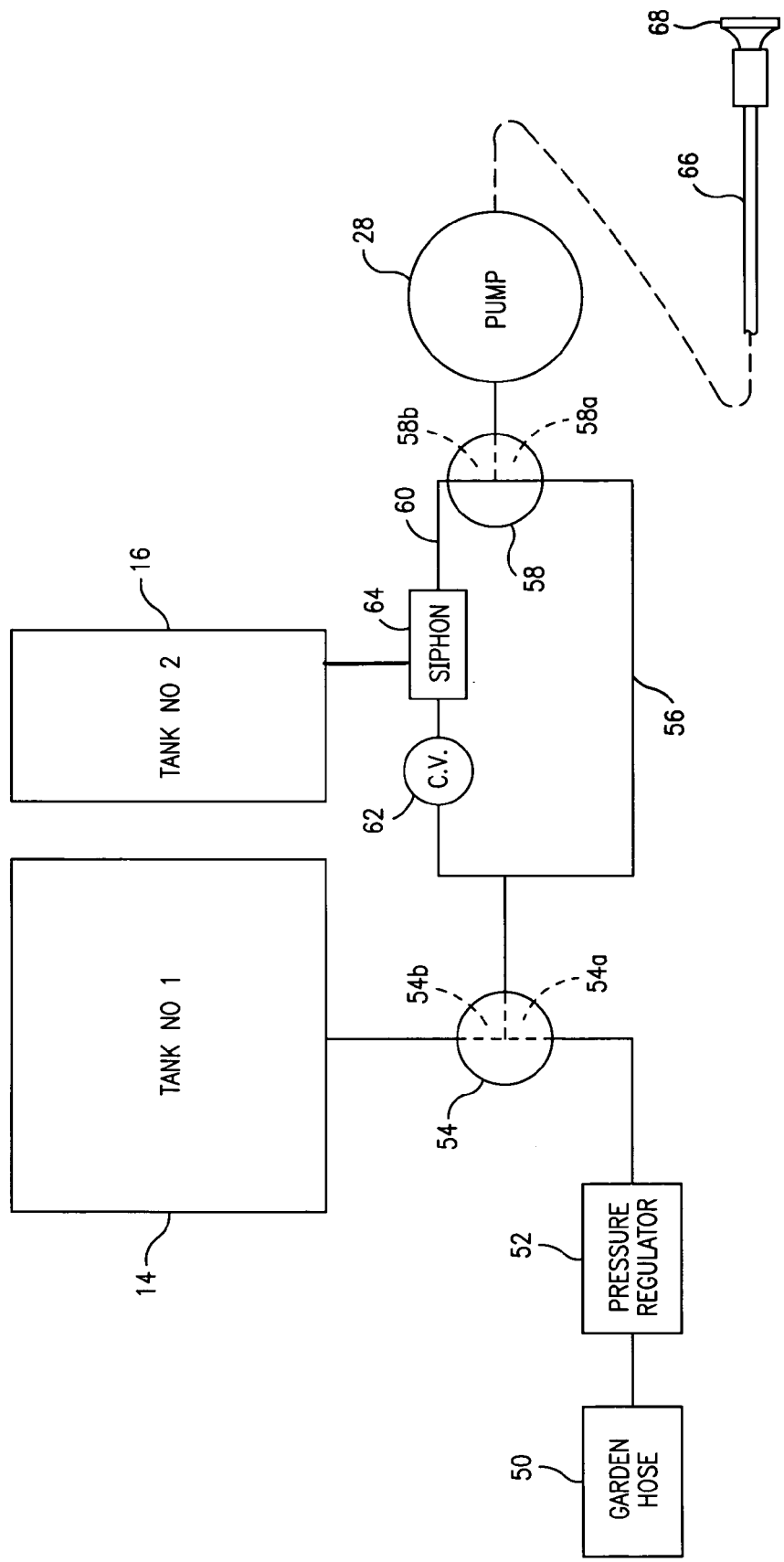
FIG. 5 is a schematic illustration of the plumbing system of the coil cleaning machine of FIG. 1.

The fluid flow or plumbing system shown schematically in FIG. 5 and located in the plumbing compartment provides motor driven pump 28 with fluids for coil cleaning including water from tank No 1 (14 FIGS. 1 and 2) and a cleaning chemical from tank No 2 (16 FIGS. 1 and 2). The water side includes a garden hose fitting 50 for sing tap water, a water pressure regulator 52 limiting to 30 psi the maximum tap water pressure supplied to the motor driven pump, a first three-way valve 54 having a first position 54a connecting tap water to the pump, and a second position 54b connecting tank water to the pump through a water line 56 and the first position 58a of a second three way valve 58.

The chemical cleaner side has a line 60 parallel to the water line up to the second three-way valve 58 and through position 58b to the pump; a one-way check valve 62 directing chemical cleaner flow toward the pump; and a siphon 64 for drawing chemical cleaner from tank No 2 into the water line. The siphon admits chemical cleaner to the water line in a range of zero to fifteen parts water to one part chemical cleaner, with a preferred solution being seven parts water to one part chemical cleaner. The siphon is adjustable for providing a mixture of water and chemical cleaner in the range specified.

Fluid from the pump is applied for cleaning coils by means of an applicator wand 66 fitted with a nozzle 68 selected for liquid flow and pressure characteristics appropriate for a particular coil being cleaned, as described more particularly below.

The fluid or plumbing side and the electric side interface through a pressure switch 70 for shutting down power to the motor driven pump when liquid flow from the pump is stopped, i.e., when a coil cleaning liquid applicator wand (described below) is shut down.

Figure 6:
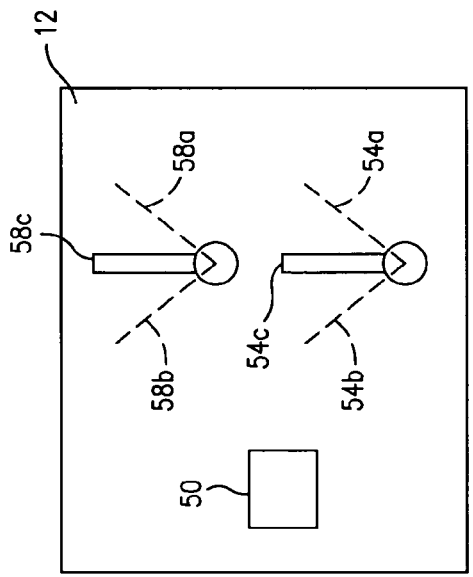
FIG. 6 is a schematic illustration of exterior mounted controls for the plumbing system of the coil cleaning machine.

FIG. 6 is a schematic illustration of exterior fittings mounted through the housing wall pertaining to the plumbing system including garden hose connection 50, operating handles or levers for both three-way valves including water lever 54c for selecting water tank No 1 or garden hose, and chemical cleaner lever 58c for turning tank no 2 "on" and "off".

The chemical cleaner for the coils can be any kind of cleaner that is not too aggressive, and is preferably slightly acidic or slightly alkaline, applied either straight or dilute. The cleaner can be for protecting aluminum finned coils against oxidation, for removing bacterial contamination, for coating a coil to prevent adhesion of dust, or for cleaning and brightening application to the coil. Foam cleaners are suitable as an aid in pushing contaminants out of a coil.

For use of the coil cleaning machine, the operator fills the water tank and the chemical cleaner tank to desired levels. The first and second three way selector valves are set, respectively, for water and chemical cleaner flow to the motor driven pump. An applicator wand and nozzle are secured to the pump outlet connection. A nozzle is chosen for spray pattern, pressure and flow rate appropriate for the particular coil being cleaned. In this phase of machine set-up, the operator can select the use of tap water through a garden hose instead of filling the water tank. The first three-way valve is then set accordingly. The operator can also select use of water only for cleaning, in which case the second three-way valve is set accordingly. In still further variations, the operator can fill both tank No 1 and tank No 2 with water, or with different chemical cleaners in tanks No 1 and No 2.

For electric preparation, the operator selects either line power or battery power for operating the machine. In selecting line power the operator moves selector switch to either 115v or 230v according to available line power. By plugging a power cord into the line power receptacle the operator selects line power (and not battery power) for machine operation. The final selection is actuating selector switch for high or low (12v or 5v DC) power for operating the motor driven pump.

The operator then decides whether to use a wheeled dolly or to backpack the machine to a coil cleaning site. With tanks filled, estimated backpack weight of the machine ready for operation is on the order of 55 pounds.

In practice, the nozzle chosen controls the pressure of fluid issuing from the applicator wand for cleaning a coil. The motor high or low power switch controls the volume flow of fluid from applicator nozzle. The machine in high power pump operation delivers a nozzle flow of 1 to 1.5 gallons per minute, and 0.25 to 0.75 gpm in low power. So with power and nozzle choices, the operator can select four combinations of high or low pressure and high or low flow. The maximum fluid operating pressure is about 150 psi.

In cleaning a coil with a chemical cleaner, the cleaner is sprayed onto a coil and allowed to dwell there for a time sufficient for the chemical to have desired effect on the coil, and is then washed away with a water spray.

When the machine is operated on battery power and the operator shuts down the applicator nozzle, the pressure switch which is set at the outlet pressure of the pump (approximately 160 psi) turns the motor off to prevent motor pump damage.

In a modification to the invention, shown in dash lines in FIG. 6 a siphon selector valve is installed to select siphon flow from tank No 1 or tank No 2, (i.e., choice of different chemical cleaners) for flow to the pump. In this case water is supplied by garden hose.

The invention including preferred and modified embodiments enables machine use combinations of water from either garden hose or tank No 1; cleaning chemicals from one or both tanks; water from both tanks; simultaneous application of mix of water and a cleaning chemical; sequential application of water and cleaning chemical; together with high and low pressure fluid application and high and low fluid flow rates.

For particular cleaning applications, a high pressure, high flow rate of water only is useful in dislodging debris such as pollen and grass clippings from outdoor condenser coils. A low pressure low flow rate of sequential applications of cleaning chemical and water is suitable for removing deposits or for coating indoor evaporator coils within interior ductwork where a minimum effective amount of fluid is desirable so as not to flood the limited drainage capacity of a collection tray and drain line normally intended for evaporator condensate.

It will be understood that the present invention provides a highly versatile, cost effective machine for cleaning HVAC coils in a sensible routine maintenance program for controlling operating costs by optimizing HVAC thermal efficiency and extending HVAC equipment useful life.

Various changes may be made to the structure embodying the principles of the invention. The foregoing embodiments are set forth in an illustrative and not in a limiting sense. The scope of the invention is defined by the claims appended hereto.

We claim:

1. A cleaning machine for HVAC coils wherein the machine is moved from work site to work site as a back pack, the machine comprising a shell housing having an upper portion and a lower portion, the housing having means for securing a harness by which the machine is backpacked, the upper portion divided vertically into two side-by-side top loading tanks fitted with removable closure caps, the tanks including a first tank for receiving water and a second tank for receiving cleaning fluid, the first and second tanks being fitted with apertures as sight glasses, the water and fluid being for use by the machine in cleaning coils, the lower portion of the shell housing divided vertically into side-by-side first and second interior compartments, the first compartment for receiving electrical components including a motor driven pump, the pump having inlet and outlet lines, the second compartment for receiving fluid flow components, the electrical components comprising a motor for driving a fluid pump, a storage battery for providing power to drive said motor, the fluid flow components comprising a first three-way valve for selecting a supply of water from one of the first tank and a connection for tap water, a pressure regulator for limiting maximum pressure of tap water supply; a second three-way valve, a line for directing the supply of water from the first valve to the second three-way valve, and through the second three-way valve to the pump inlet line, the fluid flow components further comprising a chemical cleaner line parallel to the water line, a check valve in the chemical line for directing flow toward the second three-way valve, a siphon in the chemical line for flow of chemical from the second tank to the second three-way valve to provide a coil cleaning solution in a range of zero to fifteen parts water to one part chemical cleaner, the second three-way valve for selecting one of water and cleaning solution in said range for flow to the pump, an applicator wand and nozzle connected to the pump outlet for directing selected flow for cleaning coils, the pump for delivering fluid to the applicator wand nozzle at a flow rate in the range of 0.25 to 1.5 gpm, and a pressure switch for shutting down power to the motor driven pump when liquid flow from the pump is stopped.

2. A coil cleaning machine as defined in claim 1 which further includes means for selecting high and low power to the pump motor, and in which at high power to the motor driven pump, the pump delivers fluid to the applicator wand nozzle at a flow rate in the range of 1 to 1.5 gpm, and further in which at low power to the motor driven pump, the pump delivers fluid to the applicator wand nozzle at a flow rate in the range of 0.25 to 0.75 gpm.

\* \* \* \* \*